US007111912B1

(12) United States Patent
Ticola

(10) Patent No.: US 7,111,912 B1
(45) Date of Patent: Sep. 26, 2006

(54) CONTROL HANDLE WITH SPIRAL POSITION SENSOR AND INTEGRAL SWITCHES

(75) Inventor: Peter F. Ticola, Sarasota, FL (US)

(73) Assignee: Honeywell International Inc., Morristown, NJ (US)

( * ) Notice: Subject to any disclaimer, the term of this patent is extended or adjusted under 35 U.S.C. 154(b) by 64 days.

(21) Appl. No.: 11/088,524

(22) Filed: Mar. 23, 2005

(51) Int. Cl.
*B60T 8/18* (2006.01)

(52) U.S. Cl. ..................... 303/22.1; 188/3 R; 188/156; 74/523; 74/543

(58) Field of Classification Search ............... 303/20.1; 188/3 R, 33, 34, 156, 164, 180, 382; 74/523–525, 74/512–514, 543–547
See application file for complete search history.

(56) References Cited

U.S. PATENT DOCUMENTS 4,570,502 A * 2/1986 Klatt ........................... 74/335
4,723,642 A * 2/1988 Grunberg et al. .......... 192/3.55
5,450,054 A * 9/1995 Schmersal .................. 338/128
5,680,307 A * 10/1997 Issa et al. ...................... 701/52
5,815,091 A 9/1998 Dames et al. .......... 340/870.34
6,162,124 A * 12/2000 Hiraoka et al. ............... 463/38
6,273,669 B1 * 8/2001 Tanaka ........................ 414/634
6,481,274 B1 * 11/2002 Rankin ....................... 73/118.1
2004/0168539 A1 * 9/2004 Rosencrantz ................. 74/543
2004/0168606 A1 * 9/2004 Rosencrantz et al. ....... 105/396

* cited by examiner

*Primary Examiner*—Devon Kramer
(74) *Attorney, Agent, or Firm*—Richard H. Krukar; Kermit D. Lopez

(57) ABSTRACT

A control handle for electro-mechanical devices, such as the brakes of a train or other vehicle, is disclosed. The control handle incorporates elements for electrical switching as well as elements for measuring the angle of rotation between the control handle's rotating portion and its stationary portion. Some of the switching elements and measuring elements are combined onto a single printed circuit board in order to reduce size, complexity, and cost.

21 Claims, 4 Drawing Sheets

CONTROL HANDLE WITH SPIRAL POSITION SENSOR AND INTEGRAL SWITCHES

TECHNICAL FIELD

Embodiments relate to a novel and improved control handle. Embodiments also relate to control handles containing both electrical switches and a spiral position sensor as integral elements.

BACKGROUND

Prior control handles are typically implemented with pneumatic, mechanical, or electrical hardware. In high reliability applications, such as for brake systems for locomotives, the control handles are almost entirely implemented with pneumatic or mechanical linkages. Control handles implemented with electrical hardware are disclosed in two published patent applications, incorporated here by reference, numbered 20040168606 and 20040168539. The control handles disclosed in those applications are superior to previous handles because they are smaller, easier to maintain, and more reliable.

Spiral sensors are a type of non-contact robust position sensor that is disclosed in U.S. Pat. No. 5,815,091, also incorporated by reference. In essence, a spiral sensor consists of 2 parts, one that moves in relation to the other. The output of the sensor is a measurement of the relative displacement between the two parts. Applications 20040168606 and 20040168539 disclose, but do not claim, using Spiral Sensors in a control handle. Applications 20040168606 and 20040168539 also disclose a control handle wherein contact switches are used to detect handle position. However, they do not disclose a control handle in which both contact switches and a Spiral sensor are used. Furthermore, they do not disclose a control handle wherein electrical switching elements and Spiral sensor elements are combined on the same printed circuit board.

The present invention combines electrical switches and Spiral sensing to overcome limitations in the prior art.

BRIEF SUMMARY

In accordance with an aspect of the embodiments a control handle is here described. By pushing and pulling on the handle, a person causes a hub mounted inside a stationary mounting block to rotate. The hub is part of a rotating assembly that includes the handle, shaft, hub, Spiral resonator and switch trace board, and a Spiral insulating cup. The stationary mounting block is part of a non-moving assembly including the block itself, a switch contact, a Spiral track and main board, and a Spiral insulating cup. The switch traces on the Spiral resonator and switch trace board and the switch contact interact to activate and deactivate electrical circuits. The Spiral resonator on the Spiral resonator and switch trace board and the Spiral track on the Spiral track and main board interact to produce a measurement of the relative angular offset between the Spiral track and the Spiral resonator. As such, rotation of the hub causes electrical switching and a changing measurement of the angular offset. The electrical circuits and the position measurement can be used to control electro-mechanical hardware, such as the brakes on a locomotive.

In accordance with another aspect, a movable shaft, connected to a moveable element is moved. The motion causes the moveable element to move in relation to a stationary element. The moveable element is part of a moveable assembly that includes the shaft, moveable element, Spiral resonator and switch trace board, and a Spiral insulating element. The stationary element is part of a non-moving assembly containing stationary element, a switch contact, a Spiral track and main board, and a Spiral insulating element. The geometry of the entire apparatus is not constrained to any one type of motion. For example, the motion could be along a line, along a curve or on a plane. The result of moving the moveable element in relation to the stationary element is electrical switching and a measurement of relative position. The electrical circuits and the position measurements can also be used to control electro-mechanical hardware, such as the brakes on a locomotive.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

Figure 1:
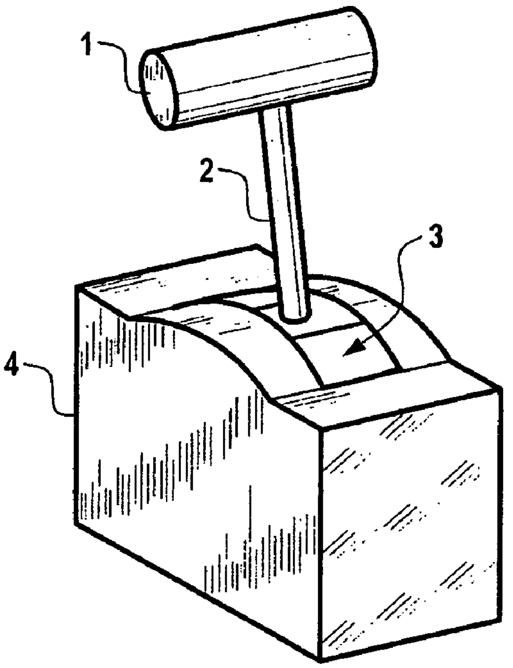
FIG. 1 illustrates a control handle wherein a stationary assembly supports a rotating assembly in accordance with an aspect of an embodiment.

The present invention is a control handle similar to those currently used to control the brakes of a train. It is an advance over the prior art handles because it combines elements of electrical switching with a Spiral position sensor. An overview of features of a control handle is shown in FIG. 1. The control handle of FIG. 1 has a grip 1 that a person can grasp and move back and forth. Moving the grip 1 causes the shaft 2 on which the grip 1 is mounted to also move. The shaft 2 is mounted on a rotating assembly 3 such that moving the shaft 2 causes the rotating assembly 3 to rotate. The rotating assembly 3 is mounted to a stationary assembly 4 in a manner that allows the rotating assembly 3 to rotate while the stationary assembly 4 remains still. Techniques for mounting the rotating assembly 3 to the stationary assembly 4 are common and include, but are not limited to, axles, bushings, and bearings.

Figure 2:
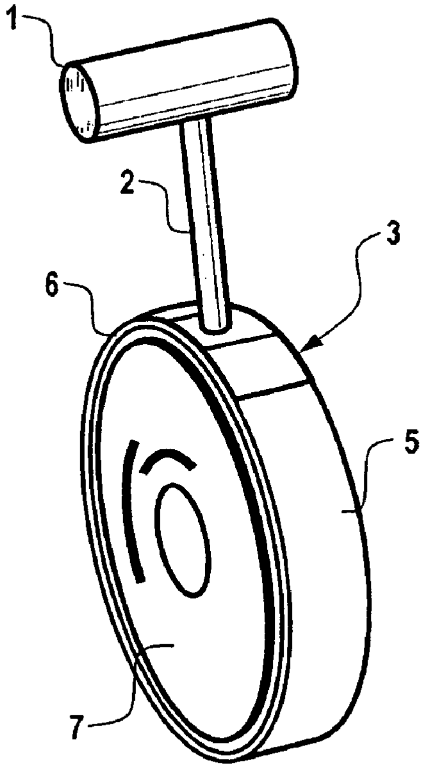
FIG. 2 illustrates the elements making up a rotating assembly in accordance with an aspect of an embodiment.

A rotating assembly 3 is shown in FIG. 2. It is made of a number of parts. In the preferred embodiment, those parts are a hub 5, rotating Spiral insulator cup 6, and Spiral resonator and trace board 7. The hub 5 is a structural member intended to provide support to other parts of the rotating assembly 3 and to provide a mechanism allowing rotational movement of the rotating assembly 3. The rotating Spiral insulator cup 6 is directly attached to the hub 5. The Spiral resonator and switch trace board 7 is attached to the hub 5 such that it lies mostly within the Spiral insulator cup 6.

Figure 3:
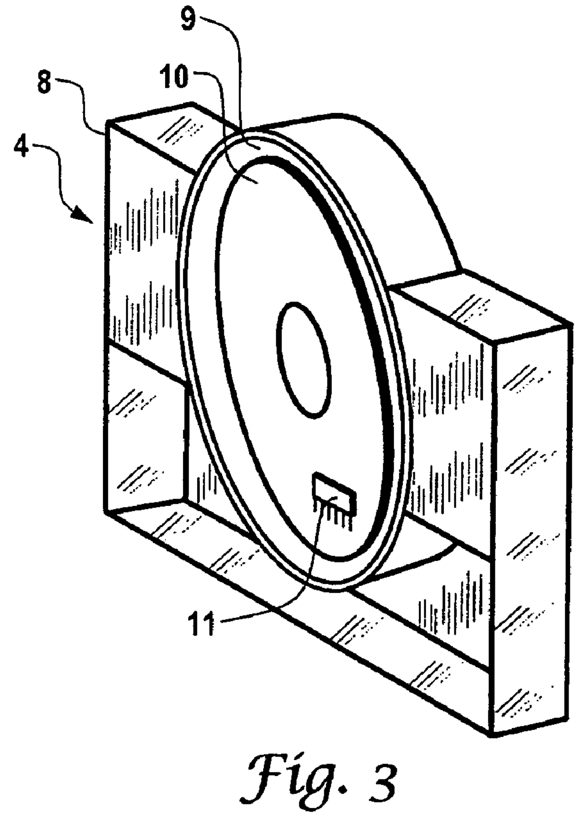
FIG. 3 illustrates the elements making up a stationary assembly in accordance with an aspect of an embodiment.

A stationary assembly is shown in FIG. 3. It is made of a number of parts. In the preferred embodiment, those parts are a stationary mounting block 8, a stationary Spiral insulator cup 9, a Spiral track and main board 10, and a switch contact 11. The stationary mounting block 8 is a structural member intended to provide support to other parts of the stationary assembly 4 and to provide a mechanism allowing rotational movement of the rotating assembly 3. The stationary Spiral insulator cup 9 is directly attached to the stationary mounting block 8. The Spiral track and main board 10 is attached to the stationary mounting block 8 such that it lies mostly within the stationary Spiral insulator cup 9. The switch contact 11 is attached to the stationary mounting block 8 such that it may interact with the switch traces 14, as discussed later.

Figure 4:
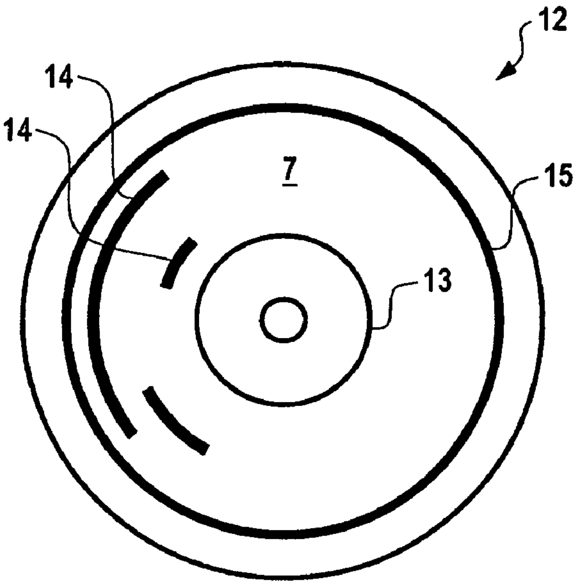
FIG. 4 illustrates a Spiral resonator and trace board in accordance with an aspect of an embodiment.

A Spiral resonator and switch trace board 7 is shown in FIG. 4. In the preferred embodiment, it is a round printed circuit board 12 on which is printed a Spiral resonator 13, switch traces 14, and a continuous trace 15. The Spiral resonator and switch trace board 7 is attached to the hub inside the Spiral insulator cup and rotates along with the hub. The switch traces 14 and continuous trace 15 are placed such that they interact with the switch contact 11 mounted on the Spiral track and main board 10 shown in FIG. 5 and FIG. 3. The Spiral resonator 13 is placed such that it will interact with the Spiral track 19, shown in FIG. 5, printed on the Spiral track and main board 10 shown in FIG. 3. A unique element of the present invention is that the Spiral resonator 13 and the switch traces 14 are printed on the same printed circuit board 12.

Figure 5:
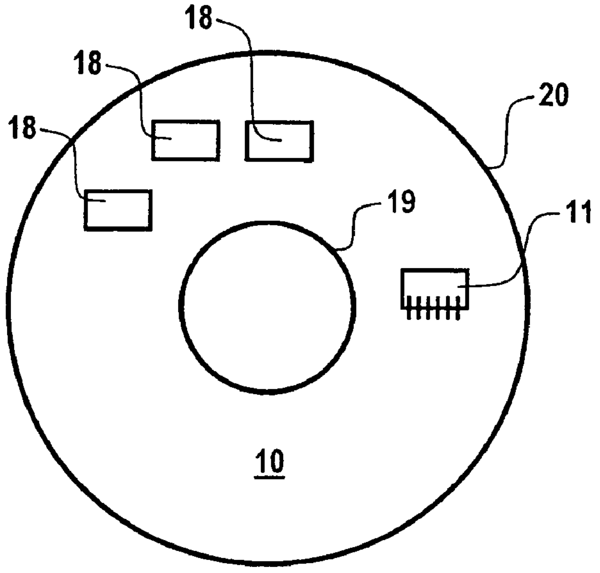
FIG. 5 illustrates a Spiral track and main board in accordance with an aspect of an embodiment.

A Spiral track and main board 10 is shown in FIG. 5. In the preferred embodiment, it is a round printed circuit board 20 on which is printed a Spiral track 19 and on which is mounted a switch contact 11 and the circuit components 18 for the Spiral sensor. The switch contact 11 and circuit components 18 do not need to be mounted on the Spiral track and main board 10 in order to embody the present invention. They are mounted there in the preferred embodiment because it is convenient to do so. Regardless of where the circuit components for the Spiral sensor are mounted, they must be electrically connected to the Spiral track 19. Regardless of how the switch contact 11 is mounted, it must be able to interact with the switch traces 14.

Figure 6:
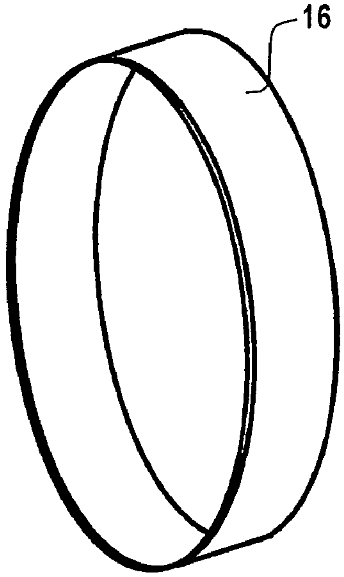
FIG. 6 illustrates a Spiral insulator cup in accordance with an aspect of an embodiment.

FIG. 6 shows a spiral insulator cup 16. Spiral sensors measure the relative offset between a Spiral resonator 13 and a Spiral track 19 by detecting the magnetic field coupling between them. The measurement can be affected by external magnetic fields. Spiral insulators shield the Spiral track 19 and Spiral resonator 13 portions of the sensor from external magnetic fields. The rotating Spiral insulator cup 6 in the rotating assembly 3 is intended to fit with the stationary Spiral insulator cup 9 in the stationary assembly such that the two cups enclose a space that is shielded from magnetic fields that exist outside that space. In some applications, the external magnetic fields are not severe enough to significantly interfere with Spiral sensing. In such applications, the Spiral insulator cups are not required to be part of the control handle assembly.

Figure 7:
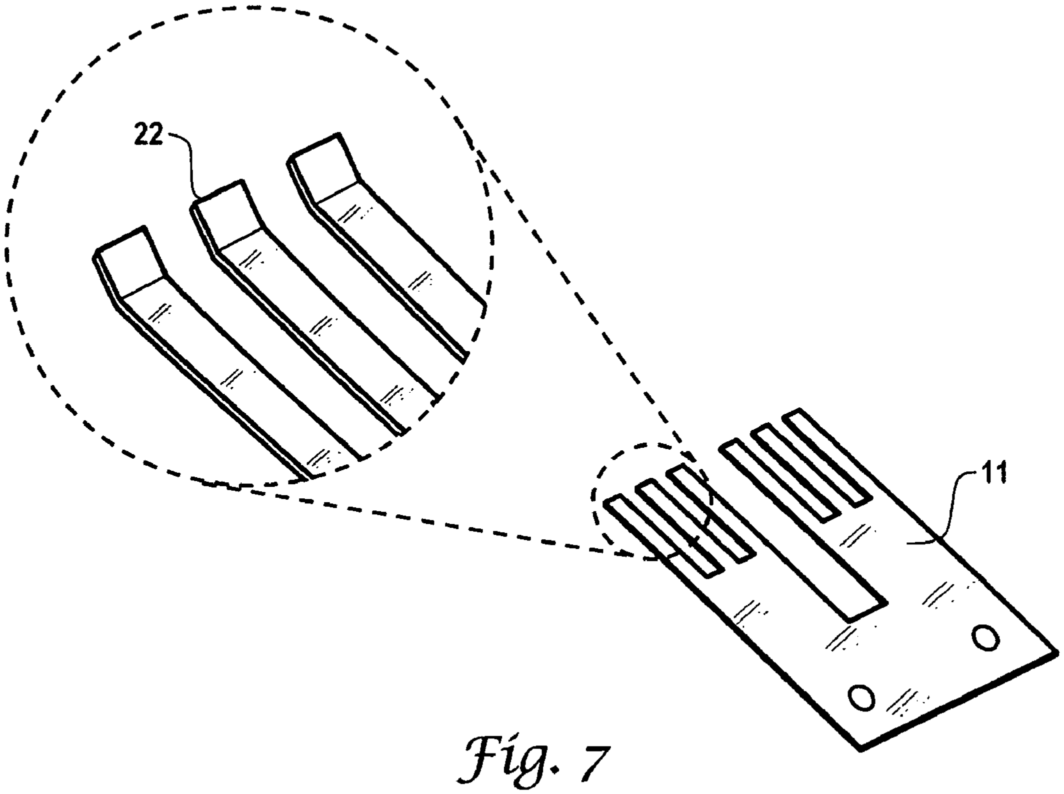
FIG. 7 illustrates a switch contact in accordance with an aspect of an embodiment.
Figure 8:
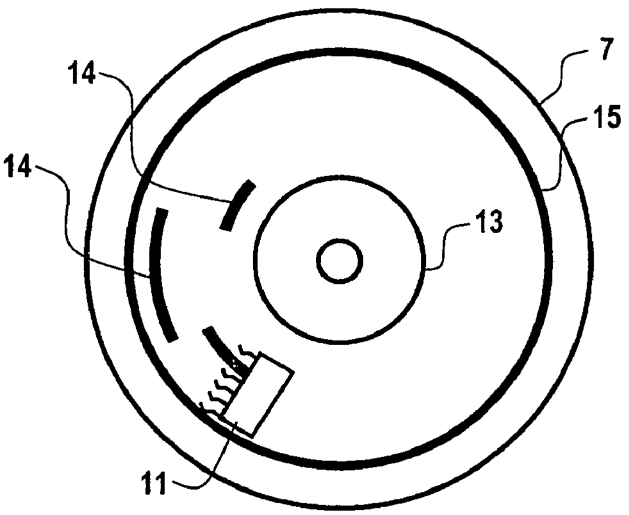
FIG. 8 illustrates a switch contact interacting with a Spiral resonator and trace board in accordance with an aspect of an embodiment.

FIG. 7 shows a switch contact 11. Any similar switch contact can be used in the preferred embodiment. Switch contact strips 22 are the parts of the switch contact 11 intended to touch the switch traces 14 as shown in FIG. 8. Although it can not be seen in FIG. 8 because a black contact strip vanishes against the black switch trace behind it, the switch contact 11 of FIG. 8 does have a contact strip touching a switch trace. The switch contact 11 is made of an electrically conducting material. As shown in FIG. 8, the purpose of the switch contact 11 is to activate an electrical circuit when electrical current can flow into one switch trace 14, into a switch contact strip 22, though the switch contact 11, out another switch contact strip 22 and into another switch trace 14 or continuous trace 15.

The design, manufacture, and use of switch traces 14, continuous traces 15, and switch contacts 11 can be understood by those skilled in the art of switching circuits. Similarly, the switch contact 11 can be used to deactivate an electrical circuit when electric current cannot flow because the switch contact strips 22 are not touching the switch traces 14 properly. In the preferred embodiment, rotation of the switch traces with respect to the contact switch completes and breaks electrical circuits. A continuous trace 15 interacts with the switch contact 11 the same way as a switch trace 14 except that switch contact strips 22 are in continuous contact with the continuous trace 15. The continuous trace in the preferred embodiment of the present invention is not required to be in all embodiments of the present invention. Similarly, there can be multiple switch contacts in a different embodiment of the present invention even though the preferred embodiment has only one. The status of the electrical circuits as activated or deactivated can be used as switched control signals. The switched control signals can be used to control the brakes of a vehicle, such as a train.

Figure 9:
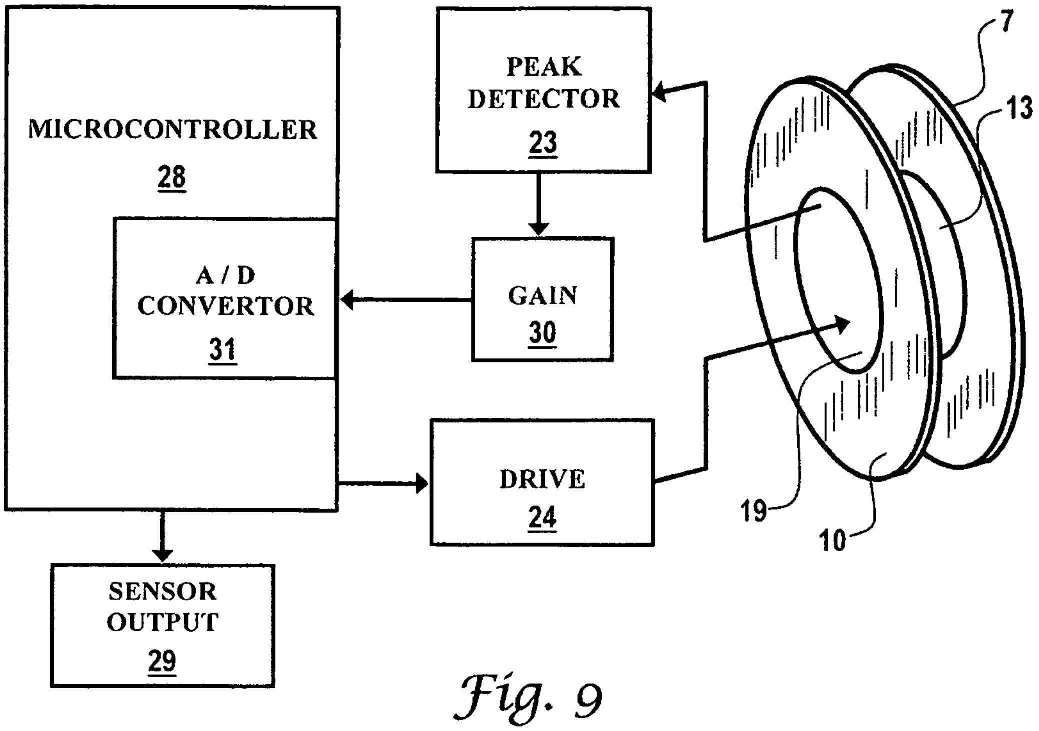
FIG. 9 illustrates a block diagram of a Spiral sensor in accordance with an aspect of an embodiment.

FIG. 9 shows many of the component parts of the Spiral sensor used in the preferred embodiment. Spiral sensor technology is fully described in U.S. Pat. No. 5,815,091, which is incorporated by reference. In the preferred embodiment, a microcontroller 28 sends control signals to Spiral drive circuitry 24. The Spiral drive circuitry 24, under control from the microcontroller 28, sends electric current into the Spiral track 19. The electric current traveling through the Spiral track 19 creates a magnetic field. The Spiral resonator 13, being in proximity to the Spiral track 19, is within the magnetic field. The magnetic field causes electrical current to flow in the Spiral resonator 13, resulting in a change in the magnetic field itself.

The Spiral resonator 13 induced changes in the magnetic field also affect the electrical current in the Spiral track 19. Changing currents in the Spiral track 19 also changes the voltage in the Spiral track 19. A peak detector 23 monitors the changing voltage and sends the peak voltage to a gain stage 30, which amplifies it. The amplified voltage from the gain stage 30 is then read, via an analog to digital converter 31, by the microcontroller 28. The microcontroller 28 uses the measured voltage to calculate the angular position of the Spiral resonator 13 in relation to the Spiral track 19 and sends that calculation out as the Spiral sensor output 29. The Spiral sensor output 29 of the Spiral resonator can be used as a control signal. The control signal can be used to control the brakes of a vehicle, such as a train.

An aspect of the embodiment illustrated in FIG. 9 is the use of a microprocessor. Other functionally equivalent electrical and electronic circuits can be used instead of a microprocessor. An oscillator can supply a signal to the Spiral drive circuitry 24. The output of the gain stage 30 can be used directly as a control signal. The gain stage 30 output can also be passed through analog or digital conditioning circuitry to produce the sensor output 29.

Figure 10:
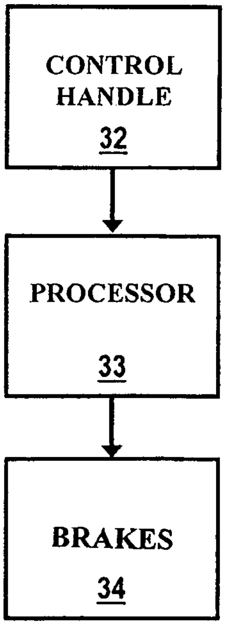
FIG. 10 illustrates processing equipment coupling the output from a control handle into vehicle brakes in accordance with an aspect of an embodiment.

The preferred embodiment produces a control output that can include the Spiral sensor output and switched control signals. As shown in FIG. 10, the control handle 32 can pass its control output to a processor 33. The processor 33 can then operate on the control output and thereby alter it. The altered control output can then be used to control, for example, the brakes 34 of a vehicle, such as a train.

Figure 11:
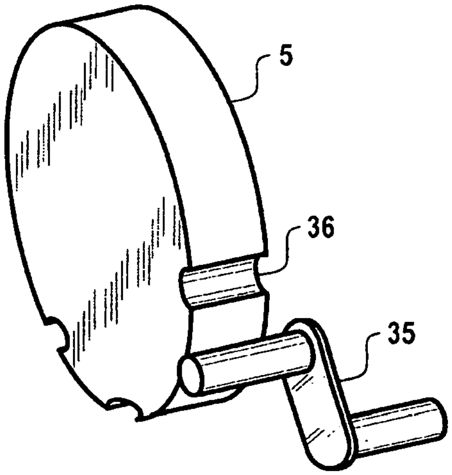
FIG. 11 illustrates a rotating hub with detents interacting with a pawl in accordance with an aspect of an embodiment.

As shown in FIG. 11, the preferred embodiment uses a pawl 35 and detent 36 mechanism to limit hub 5 movement, supply operator feedback, and help the hub 5 maintain position. The pawl 35 is pressed against the hub 5. When a detent 36 aligns with the pawl 35, the pawl 35 is pressed into the detent 36. The effect is to pull the hub 5 into a position aligning the pawl 35 with the detent 36 and to increase the amount of force needed to move the hub 5 away from the aligned position. A human operator can feel the pull and the increased force. The increased force also helps keep the hub 5 in place. Finally, the detent 36 can be shaped such that the pawl 35 can not be forced back out via rotational force in one direction or in any direction.

An advantage of the present invention is that it is smaller, and less expensive than other control handles. A control handle with multiple Spiral sensors and switching elements can be built. In the preferred embodiment, all of the Spiral elements and switching elements are on one side of the hub 5. All those elements can be duplicated on the other side of the hub to produce a control handle with multiple or redundant outputs. Similarly, those elements can also be put onto the same printed circuit board to again produce a control handle with multiple or redundant outputs.

The preferred embodiment is restricted to rotary movement. Another embodiment of the invention removes that restriction to allow the moveable portion of the control handle to move along a line, plane, or curve. The alternative embodiments would operate similarly to the preferred one, but for some minor changes in certain elements. The minor changes are the result of replacing the rotationally constrained elements with ones that are not so constrained. The hub becomes a moveable member. The Spiral cups become Spiral insulating forms. The stationary mounting block becomes a stationary member. The function of these parts remains the same while their range of allowed movement is no longer constrained to rotation.

The embodiment and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those skilled in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

What is claimed is:

1. A control handle comprising:
- a grip arranged to be grasped by a human operator;
- a shaft fastened to the grip;
- a hub fastened to the shaft and arranged to be moved rotationally by the shaft;
- a spiral resonator and switch trace board supported by the hub;
- a stationary mounting block supporting the hub for movement;
- a switch contact supported by the stationary mounting block; and
- a spiral track and main board supported by the stationary mounting block.

2. The control handle of claim 1 further comprising a spiral insulating cup supported by the hub and a spiral insulating cup supported by the stationary mounting block such that the spiral resonator and switch trace board and the spiral track and main board are protected from external magnetic fields.

3. The control handle of claim 1 wherein the handle is coupled so as to control brakes of a vehicle.

4. The control handle of claim 3 further comprising processing equipment coupling the handle to the brakes of the vehicle.

5. The control handle of claim 3 wherein the brakes comprise brakes of a train.

6. The control handle of claim 1 further comprising at least one pawl supported by the stationary mounting block and at least one detent in the hub.

7. A method comprising:
- converting movement of a human operator to mechanical movement of a shaft;
- moving a hub in response to the movement of the shaft, wherein the hub is attached to the shaft and is supported by a stationary mounting block;
- moving a spiral resonator and switch trace board supported by the hub;
- determining a hub position measurement of the movement of the spiral resonator board and switch trace board in relation to a spiral track and main board where the spiral track and main board is supported by the stationary mounting block;
- activating and deactivating electrical circuits based on the interaction of the spiral resonator board and a switch contact where the switch contact is supported by the stationary mounting block; and
- generating as a control output based on the hub position measurement and the states of the electrical circuits.

8. The method of claim 7 further comprising controlling and braking of a vehicle in response to the control output.

9. The method of claim 8 further comprising processing the control output to produce a processed output and using the processed output to control the brakes of the vehicle.

10. The method of claim 8 wherein the vehicle is a train.

11. The method of claim 7 further comprising setting hub position or controlling hub movement via at least one detent on the hub and at least one pawl supported by the stationary mounting block.

12. The method of claim 8 further comprising setting hub position or controlling hub movement via at least one detent on the hub and at least one pawl supported by the stationary mounting block.

13. A control handle comprising:
- a moveable shaft;

a moveable member fixedly fastened to the moveable shaft and arranged to be moved by the moveable shaft;

a spiral resonator and switch trace board supported by the moveable member;

a stationary member supporting the moveable member for movement;

a switch contact supported by the stationary member; and a spiral track and main board supported by the stationary member.

14. The control handle of claim 13 wherein the control handle is coupled to brakes of a vehicle.

15. The control handle of claim 14 further comprising processing equipment coupling the handle to the brakes of the vehicle.

16. The control handle of claim 15 wherein the vehicle is a train.

17. The control handle of claim 14 wherein the vehicle is a train.

18. The control handle of claim 13 further comprising at least one pawl supported by the stationary member and at least one detent in the movable member.

19. The control handle of claim 14 further comprising at least one pawl supported by the stationary member and at least one detent in the movable member.

20. The control handle of claim 15 further comprising at least one pawl supported by the stationary member and at least one detent in the movable member.

21. The control handle of claim 13 further comprising a spiral insulating form supported by the movable member and a spiral insulating form supported by the stationary member such that the spiral resonator and switch trace board and the spiral track and main board are protected from external magnetic fields.

* * * * *